(12) United States Patent
Fujimoto

(10) Patent No.: US 9,930,292 B2
(45) Date of Patent: Mar. 27, 2018

(54) TELECONFERENCE TERMINAL APPARATUS, TELECONFERENCE SYSTEM, AND TELECONFERENCE METHOD

(75) Inventor: Jun Fujimoto, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 1266 days.

(21) Appl. No.: 11/519,847

(22) Filed: Sep. 13, 2006

(65) Prior Publication Data
US 2007/0132838 A1 Jun. 14, 2007

(30) Foreign Application Priority Data
Sep. 14, 2005 (JP) ................. 2005-267037

(51) Int. Cl.
*H04N 7/15* (2006.01)
*H04N 7/14* (2006.01)

(52) U.S. Cl.
CPC ............. *H04N 7/15* (2013.01); *H04N 7/142* (2013.01); *H04N 7/147* (2013.01)

(58) Field of Classification Search
CPC ............ H04N 7/14; H04N 7/15; H04N 7/152; H04N 7/142; H04N 7/147
USPC ...... 348/14.01–14.06, 462; 370/94.1, 60, 79, 370/110.1; 725/143
See application file for complete search history.

(56) References Cited

U.S. PATENT DOCUMENTS

| 5,477,542 | A | * | 12/1995 | Takahara | H04J 3/177 348/14.05 |
| 6,269,483 | B1 | * | 7/2001 | Broussard | H04N 7/148 348/14.12 |
| 7,007,098 | B1 | * | 2/2006 | Smyth | H04L 29/06027 348/E7.084 |
| 2004/0263636 | A1 | * | 12/2004 | Cutler | H04N 7/15 348/211.12 |
| 2005/0099492 | A1 | * | 5/2005 | Orr | H04L 12/1827 348/14.08 |

FOREIGN PATENT DOCUMENTS

JP 5-153585 6/1993

* cited by examiner

*Primary Examiner* — Melur Ramakrishnaiah
(74) *Attorney, Agent, or Firm* — Lex IP Meister, PLLC

(57) ABSTRACT

The present invention provides a teleconference terminal apparatus for carrying out a teleconference by transmitting/receiving image and voice signals via a communications network. The teleconference terminal apparatus comprises: an image-capturing device which generates an image signal by capturing an image; an image processing section which converts the image signal to a signal mode corresponding to the communications network and outputs the converted signal; a microphone which performs detection of a voice along with the image capturing, and thereby generates a voice signal corresponding to the level of the voice; a voice processing section which converts the voice signal to a signal mode corresponding to the communications network and outputs the converted signal; and a computing section which increases or reduces the amount of data of the image signal outputted from the image processing section, on the basis of the level of the voice signal.

15 Claims, 4 Drawing Sheets

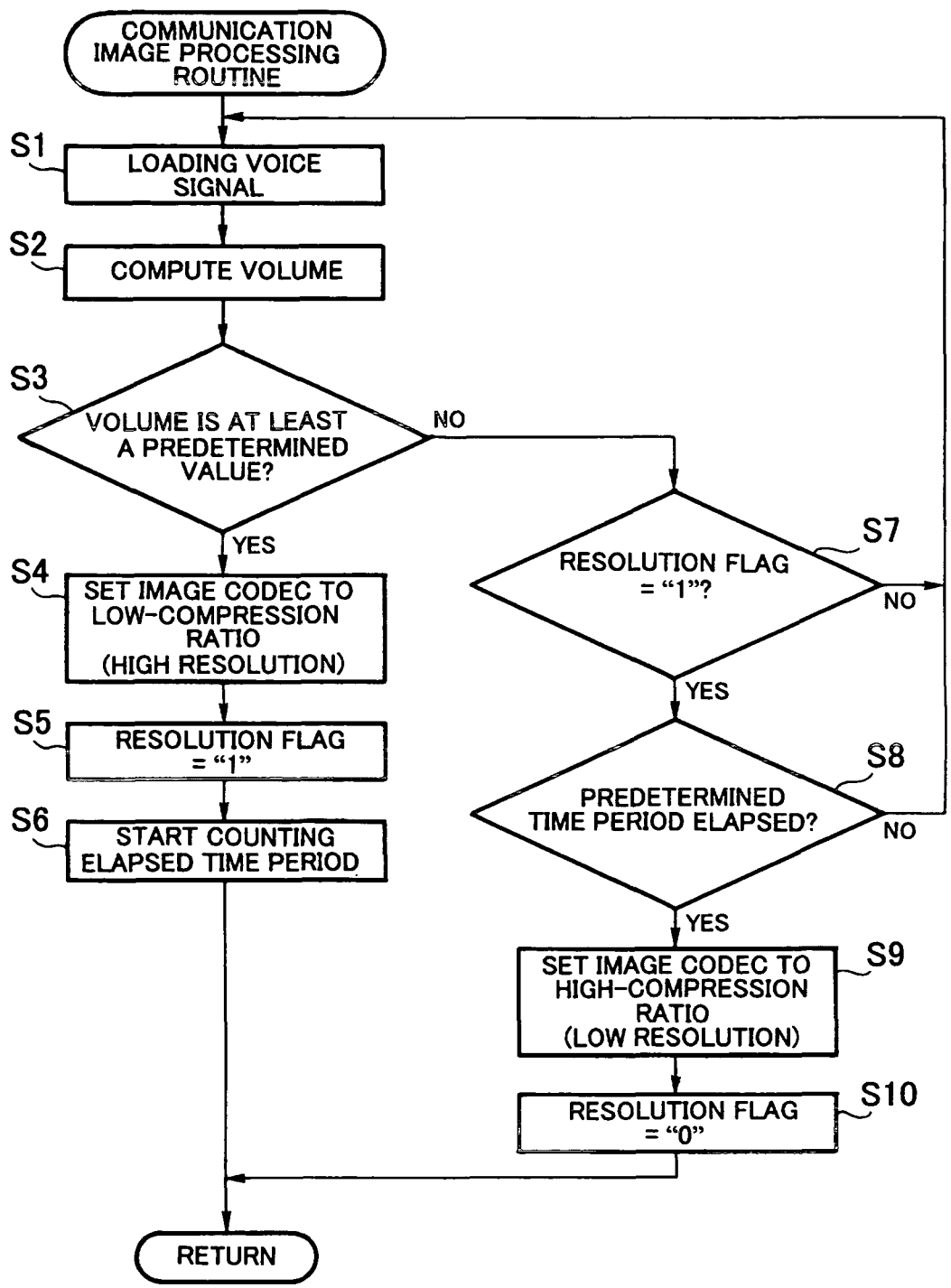

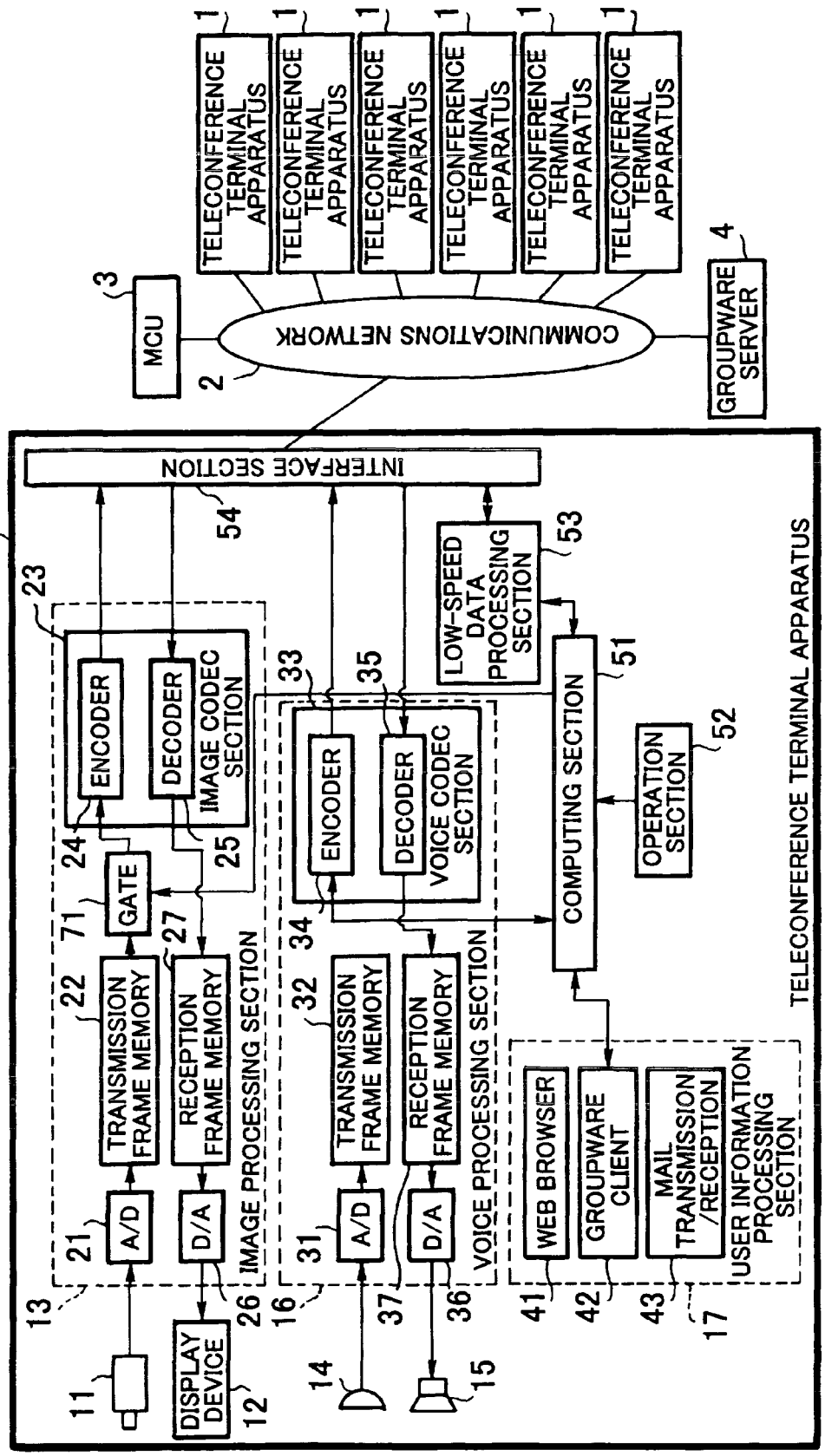

TELECONFERENCE TERMINAL APPARATUS, TELECONFERENCE SYSTEM, AND TELECONFERENCE METHOD

RELATED APPLICATIONS

This application claims the priority of Japanese Patent Application No. 2005-267037 filed on Sep. 14, 2005, which is incorporated herein by reference.

BACKGROUND OF THE INVENTION

Field of the Invention

The present invention relates to a teleconference terminal apparatus, teleconference system, and teleconference method for carrying out a teleconference using a communications line.

Description of the Prior Art

Conventionally, as a teleconference system for carrying out a teleconference among a plurality of points, there has been proposed a configuration comprising a plurality of mobile units capable of transmitting voice signals and image signals, a parent station connected to these mobile units via a communications network, an image transmission device provided in the parent station and capable of identifying a voice signal and switching between motion and still images, and a plurality of monitors connected to the image transmission device and capable of displaying images of all the mobile units.

In the above configuration, still images of conditions of all of the mobile units are displayed on the monitors. Then, image signals obtained by each mobile unit recording a motion image are transmitted along with voice signals to the image transmission device of the parent station, and a mobile unit in-use is identified by the image transmission device on the basis of the voice signals from each mobile unit, whereby only an image projected on the monitor corresponding to the mobile unit in-use is switched from a still to a motion image. Accordingly, still images of the conditions of all of the mobile units can be monitored and a motion image of the mobile unit in-use can be displayed on the monitor without selecting operation particularly on the parent station side (Japanese Unexamined Patent Publication No. H5-153585).

However, in the teleconference system described in the above publication document, since all of the mobile units transmit image signals of motion images to the parent station regardless of whether the mobile units are in use, the traffic of the communications network between the mobile units and the parent station easily expands excessively, thus the problem is that the amount of data of the image signals should be reduced although the quality of the motion images deteriorates.

SUMMARY OF THE INVENTION

An object of the present invention therefore is to provide a teleconference terminal apparatus, teleconference system, and teleconference method capable of checking contents of particular importance, through good image quality and the like, while preventing the traffic in the communications network from expanding.

The present invention is a teleconference terminal apparatus for carrying out a teleconference by transmitting and receiving an image signal and voice signal via a communications network, the teleconference terminal apparatus comprising: an image-capturing device which generates an image signal by capturing an image; an image output processing section which converts the image signal to a signal mode corresponding to the communications network and which outputs the converted signal; a microphone which performs detection of a voice along with the image capturing, and thereby generates a voice signal corresponding to level of the voice; a voice output processing section which converts the voice signal to a signal mode corresponding to the communications network and outputs the converted signal; and an image output processing control section which increases or reduces the amount of data of the image signal outputted from the image output processing section, on a basis of the level of the voice signal.

Further, the present invention may be configured such that the image output processing section comprises an image codec section which compresses the image signal, and the image output processing control section increases or reduces the data amount by changing the compression ratio of the image signal in the image codec section.

Moreover, the present invention may be configured such that the image output processing control section is connected to at least an encoder section of the image codec section and a transmission frame memory of the voice output processing section, which loads a voice signal transmitted from the transmission frame memory, and which transmits, to the encoder section, a command signal associated with increase or reduction of the data amount of the image signal, on a basis of level information of the loaded voice signal.

In addition, the present invention may be configured such that the image output processing control section determines whether the level information of the loaded voice signal, which is inputted, is a predetermined value or more, and wherein the command signal is transmitted to the encoder section such that, if the level information is at least the predetermined value as a result of the determination, the image signal is obtained as low-compression ratio data, and, if the level information is less than the predetermined value as a result of the determination, the image signal is obtained as high-compression ratio data.

Further, the present invention may be configured such that in a case in which the level information is less than the predetermined value as a result of the determination, when a current image is set so that the low-compression ratio data are obtained, the determination is repeated until a predetermined time period elapses, and as a result the command signal is transmitted to the encoder section so that the image signal is obtained as high-compression ratio data, on the condition that it is still determined that the level information is less than the predetermined value.

Furthermore, the present invention may be configured such that the image output processing section comprises a gate which stops transmission of image signals, and the image output processing control section increases or reduces the data amount by stopping transmission of image signals in the gate at fixed intervals.

The teleconference system of the present invention comprises: a plurality of the teleconference terminal apparatuses having the configuration described above; and a communications network which connects the teleconference terminal apparatuses to communicate data.

The present invention is a teleconference communication method for carrying out a teleconference by transmitting and receiving an image signal and voice signal via a communications network, wherein when an image signal generated by capturing an image is converted to a signal mode corresponding to the communications network and outputted, the amount of data of the image signal is increased or reduced on the basis of the level of a voice which is generated by detecting voice when the image capturing is performed.

BRIEF DESCRIPTION OF THE DRAWINGS

FIG. 3 is a flowchart showing a communication image processing routine; and

FIG. 4 is a schematic drawing of the teleconference system according to the embodiment.

DESCRIPTION OF THE PREFERRED EMBODIMENTS

An embodiment of the present invention is described hereinafter with reference to FIG. 1 through FIG. 4.

(Teleconference System)

Figure 1:
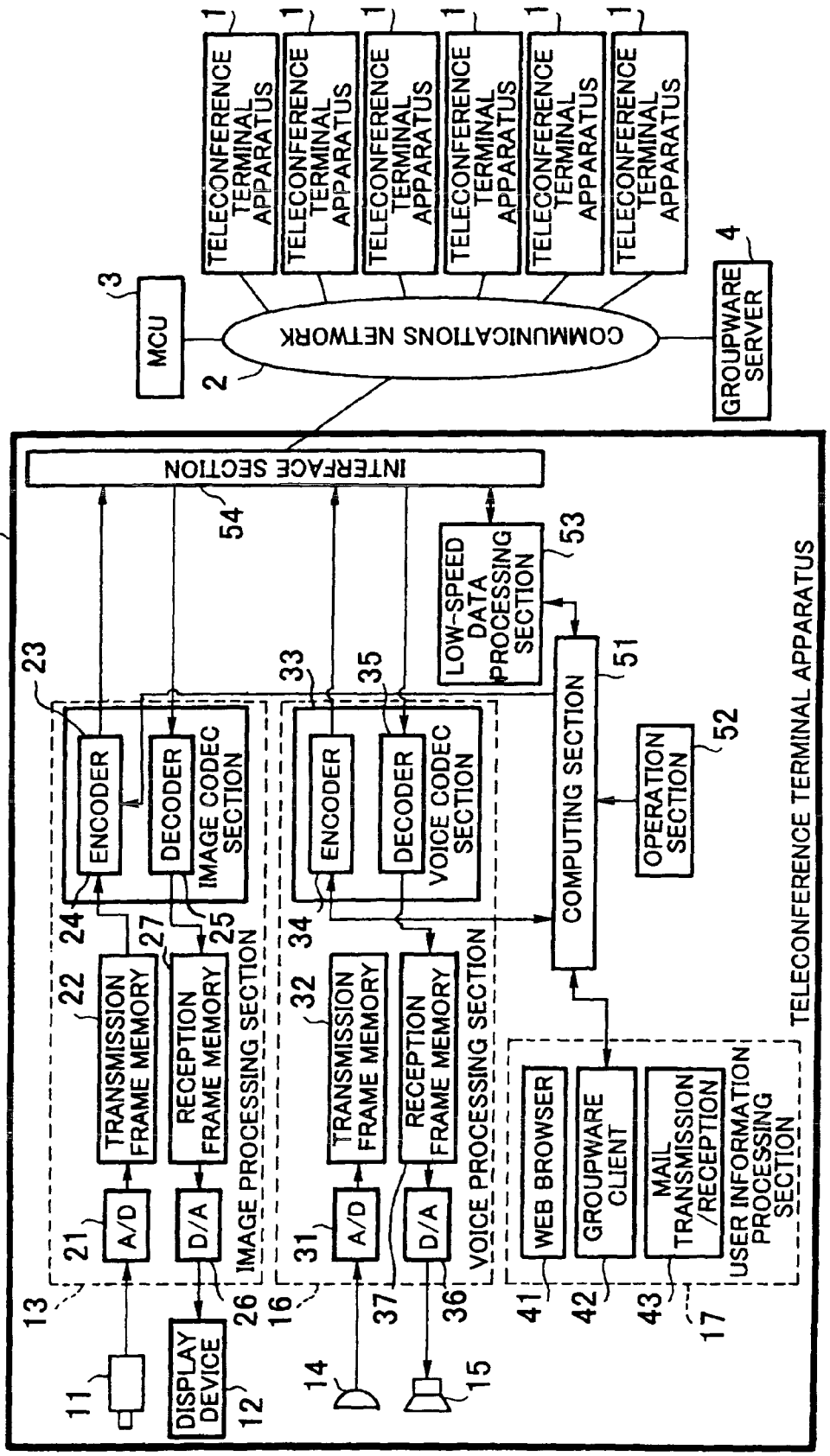
FIG. 1 is a schematic drawing of a teleconference system according to an embodiment.

The teleconference system according to the present embodiment has, as shown in FIG. 1, a communications network 2 such as a public line and private line, a teleconference terminal apparatus 1, which is described later, for carrying out a teleconference by transmitting and receiving an image signal and a voice signal via the communications network 2, a MCU 3 (Multipoint Control Unit) which controls multipoint connections among the teleconference terminal apparatuses 1 within the communications network 2, and a groupware server 4 which manages the teleconference terminal apparatuses 1 for users and the like. It should be noted that the teleconference terminal apparatus 1, MCU 3, and groupware server 4 are configured from commercially available workstations, personal computers (PC), network connection devices, and the like. The functions contained in the teleconference terminal apparatuses 1 and the like are realized by the hardware such as the workstations, PCs, network connection devices and the like, and software processing using these hardware resources.

The MCU 3 is configured such as to combine/distribute videos/voices by simultaneously connecting three or more points to switch or mix the videos and voices, and thereby realizes a teleconference. Specifically, the MCU 3 is configured so as to be able to perform setting of used resources for each conference, and setting of a communication rate, audio rate, video rate, video session, the number of split screens, video protocol, participant setting information consisting of the type of the interface type, connection type, IP address, telephone number, signal port, the number of line channels, and voice level (volume) of a participant, the time and date for starting to reserve a conference, and duration time information.

Furthermore, the groupware server 4 is connected to the teleconference terminal apparatuses 1 and other terminal apparatus having a groupware client function, and has a database required for performing collaboration work in a group of users by using these teleconference terminal apparatuses 1, and a database server which manages the database. Moreover, the groupware server 4 has a conference reservation function for performing notification of a conference via an email to a participant in the conference, a schedule management function for managing a schedule, and other functions.

(Teleconference Terminal Apparatus 1)

The teleconference terminal apparatus 1, which is used in the teleconference system configured as described above, has an image-capturing device 11 which generates an image signal by capturing an image of a subject such as a person or the like, a display device 12 such as a liquid crystal display device which displays the image signal on a screen, and an image processing section 13 which is connected to the image-capturing device 11 and the display device 12.

The image processing section 13 has an image transmission conversion function which converts an image signal sent from the image-capturing device 11 to a signal mode corresponding to the communications network 2, and an image reception conversion function which converts an image signal sent from the communications network 2 to a signal mode corresponding to the display device 12. The image transmission conversion function is realized by an A/D converter 21 which converts the image signal sent from the image-capturing device 11 to a digital signal, a transmission frame memory 22 which stores the image signal digitalized by the A/D converter 21, an encoder section 24 of an image codec section 23, and the like. Moreover, the image reception conversion function is realized by a decoder section 25 of the image codec section 23, a reception frame memory 27 which stores an image signal outputted from the decoder section 25, a D/A converter 26 which converts the image signal to an analog signal, and the like.

The encoder section 24 of the image codec section 23 is provided with an image codec which converts uncompressed image data to a form of a compressed file. Furthermore, the encoder section 24 is capable of changing a compression process between two stages of high compression ratio and low compression ratio. The encoder section 24 is capable of switching between high compression ratio and low compression ratio such that when inputting a voice detection signal from a computing section 51 which is described hereinafter, data is compressed at a low compression ratio, and in a case other than when inputting a voice detection signal, data is compressed at a high compression ratio. Further, the decoder section 25 of the image codec section 23 comprises an image codec which returns the compressed file of the image data to an uncompressed file. It should be noted that the image codec does not perform lossless compression in which a compressed file can be completely returned to the original file when the compressed file is decoded (unpacked), but performs lossy compression for processing the file to the extent that the quality of the original file is not damaged.

Figure 2:
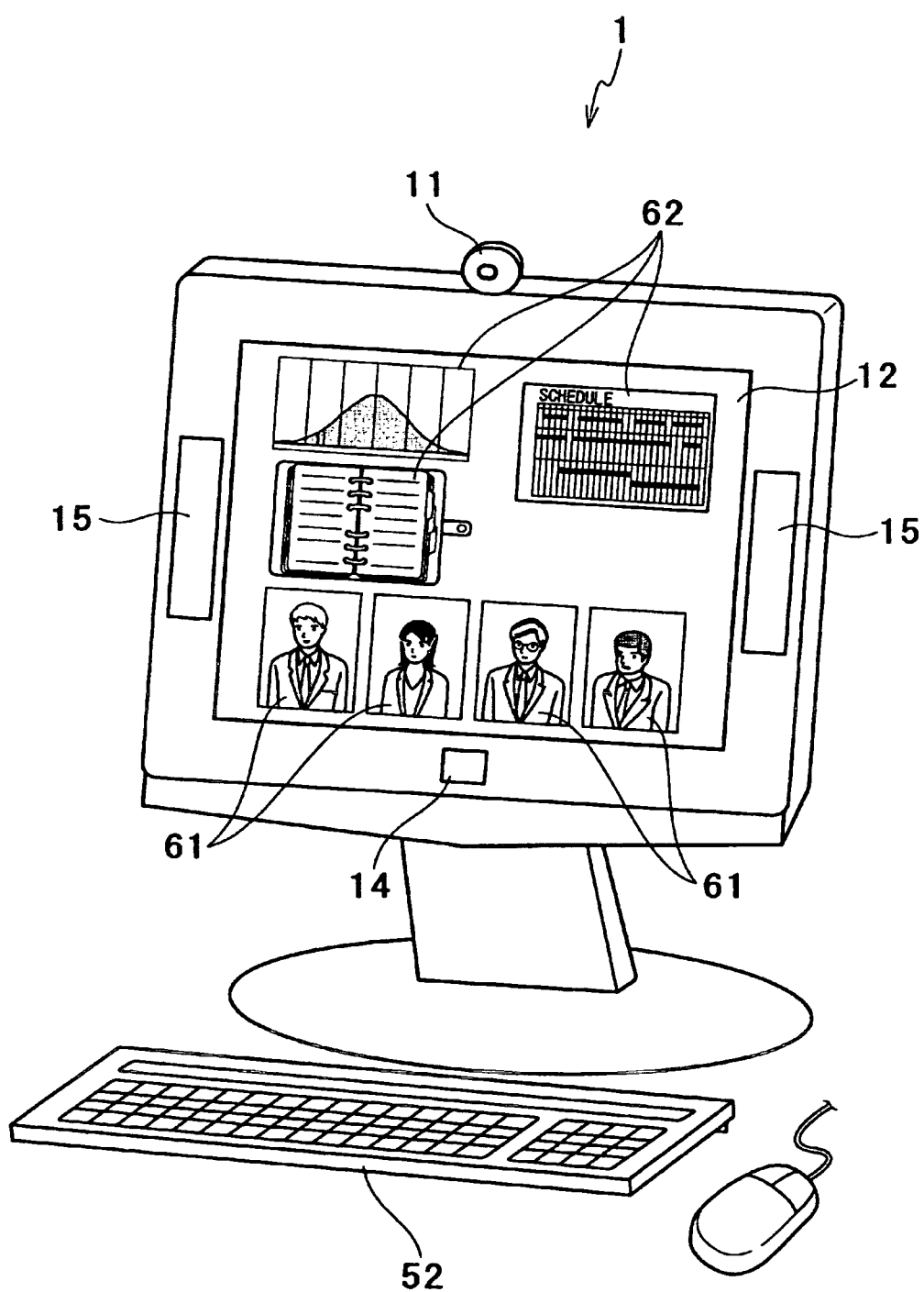
FIG. 2 is an explanatory diagram of a display screen of a teleconference terminal apparatus.

Moreover, the teleconference terminal apparatus 1 further comprises, as shown in FIG. 2 as well, a microphone 14 which performs detection of a voice along with image capturing performed by the image-capturing device 11, and thereby generates a voice signal corresponding to the level of the voice, a speaker 15 which outputs the voice signal as a voice, and a voice processing section 16 which is connected to the microphone 14 and the speaker 15.

The voice processing section 16 has a voice transmission conversion function which converts a voice signal sent from the microphone 14 to a signal mode corresponding to the communications network 2, and a voice reception conversion function which converts a voice signal sent from the communications network 2 to a signal mode corresponding to the speaker 15. The voice transmission conversion function is realized by an A/D converter 31 which converts the voice signal sent from the microphone 14 to a digital signal, a transmission frame memory 32 which stores the voice signal digitalized by the A/D converter 31, an encoder section 34 of a voice codec section 33, and the like. Further, the voice reception conversion function is realized by a decoder section 35 of the voice codec section 33, a reception frame memory 37 which stores a voice signal outputted from the decoder section 35, a D/A converter 36 which converts the voice signal to an analog signal, and the like.

As with the image codec section 23, the voice codec section 33 has a voice codec which converts uncompressed data to a form of a compressed file in the encoder section 34 and decodes (unpacks) the compressed file to an uncompressed file in the decoder section 35.

The image processing section 13 and the voice processing section 16 are connected to an interface section 54. The interface section 54 is connected to the communications network 2. The teleconference terminal apparatus 1 can perform data communication with other teleconference terminal apparatus 1, MCU 3, or groupware server 4 via the communications network 2.

The interface section 54 is connected to the computing section 51 via a low-speed data processing section 53 which processes control data and the like. The computing section 51 is connected to the low-speed data processing section 53, the encoder section 24 of the image codec section 23, and the transmission frame memory 32 of the voice processing section 16, and is capable of transmitting a voice detection signal to the encoder section 24 and reading a voice signal from the transmission frame memory 32.

The computing section 51 comprises a CPU (central processing unit), memory, and the like, and controls an operation of the teleconference terminal apparatus 1. Specifically, by, for example, executing the communication image processing routine shown in FIG. 3, when converting an image signal generated by image-capturing to a signal mode corresponding to the communications network 2 and outputting the converted signal, the amount of data of the image signal is increased or reduced on the basis of the level of a voice which is generated by detecting voice when image-capturing is performed. Accordingly, contents of particular importance can be checked, through good image quality and the like, while preventing the traffic in the communications network 2 from expanding. In other words, the computing section 51 stores data so that the communication image processing routine, which increases or reduces the amount of data of an image signal on the basis of the level of a voice generated by detecting voice when image-capturing is performed, can be executed such that the contents of particular importance can be checked, through good image quality and the like, while preventing the traffic in the communications network 2 from expanding.

Moreover, an operation section 52 such as a keyboard or mouse, and a user information processing section 17 are connected to the computing section 51. The user information processing section 17 is provided with a web browser function 41, a groupware client function 42, mail transmission/reception function 43, and the like. Accordingly, the teleconference terminal apparatus 1 can view a web page present on the Internet, by means of the web browser function 41, and also can transmit or receive mails to and from other teleconference terminal apparatus 1 or the like by means of the mail transmission/reception function 43. Furthermore, the teleconference terminal apparatus 1 can perform collaboration work in a group of users in conjunction with other teleconference terminal apparatus 1 having the groupware client function, via the groupware server 4, by means of the groupware client function 42. For example, an email can be transmitted to each teleconference terminal apparatus 1 or other terminal apparatus to notify of teleconference via the groupware server 4 to reserve the teleconference, or detailed preparation associated with the teleconference can be performed using the web browser function 41.

(Screen Display of Teleconference Terminal Apparatus 1)

The teleconference terminal apparatus 1 configured as described above displays, as shown in FIG. 2, a participant display section 61 which displays a motion image of a participant to a teleconference, and a resource display section 62 which displays resources such as data and schedules used in the conference. The number of participant display sections 61 corresponds to the number of participants. The participant display section 61 displays a high-quality motion image of a speaking participant on a screen, and at the same time displays a low-quality motion image of a participant, who is not speaking, on the screen.

It should be noted in the present embodiment that the participant display section 61 displaying a speaking participant is configured so as to display a high-quality image. However, examples of the configuration are not limited to this example, thus, for example, the image quality of the participant display section 61 may be enhanced and the participant display section 61 itself may be enlarged, or a display position on the participant display section 61 may be changed to a center or the like.

(Operations of Teleconference System and Teleconference Terminal Apparatus 1)

With the above configuration, an operation of the teleconference system is explained, and an operation of the teleconference terminal apparatus 1 is explained with reference to the communication image processing routine shown in FIG. 3.

In the groupware server 4 a schedule of a conference is managed. When it is determined that the conference is carried out on predetermined time and date, a mail for notifying of the conference is transmitted from the groupware server 4 to the teleconference terminal apparatus 1 having the groupware client function or other terminal apparatus. A person who receives the notification of the conference sets the image-capturing device 11, microphone 14, and the like of the teleconference terminal apparatus 1 to an operating state, reads information required in the conference by means of the web browser function 41 of the user information processing section 17, as shown in FIG. 2, and causes the resource display section 62 to display the information, to prepare for the conference. Then, by operating the operation section 52, the person reports to the groupware server 4 that preparation for the conference is completed.

When the preparation for the conference is completed, in the image processing section 13, an image signal which is obtained by capturing an image of a participant by means of the image-capturing device 11 is loaded to the A/D converter 21, converted into a digital signal, stored temporarily in the transmission frame memory 22, and thereafter compressed at a compression ratio based on a voice detection signal in the encoder section 24 of the image codec section 23. The compressed image signal is outputted from the image processing section 13 to the interface section 54, and is transmitted to other teleconference terminal apparatus 1 via the MCU 3 through the communications network 2, or transmitted directly to other teleconference terminal apparatus 1 via the communications network 2. Further, the image signal which is received via the communications network 2 is decoded (unpacked) by the decoder section 25, temporarily stored in the reception frame memory 27, changed to an analog signal by the D/A converter 26, and then outputted to the display device 12. It should be noted that an own image signal is also outputted to the display device 12 by the reception frame memory 27 or an unshown display circuit. Accordingly, as shown in FIG. 2, motion images of, for example, four participants are displayed on the participant display section 61 of the display device 12.

Further, in the voice processing section 16, a voice signal which is obtained by collecting sounds of participants by means of the microphone 14 is loaded to the A/D converter 31, converted into a digital signal, and temporarily stored in the transmission frame memory 32. The signal is then outputted from the transmission frame memory 32 to the computing section 51, outputted to the voice codec section 33, and compressed at a predetermined compression ratio by the encoder section 34 of the voice codec section 33. Thereafter, the compressed voice signal is outputted from the voice processing section 16 to the interface section 54, and transmitted to other teleconference terminal apparatus 1 via the MCU 3 through the communications network 2, or transmitted directly to other teleconference terminal apparatus 1 via the communications network 2. The voice signal received via the communications network 2 is decoded (unpacked) by the decoder section 35, temporarily stored in the reception frame memory 37, converted into an analog signal by the D/A converter 36, and then outputted to the speaker 15. Accordingly, as shown in FIG. 2, a speech of a participant is outputted as a voice from the speaker 15 of the teleconference terminal apparatus 1.

When the image signal and the voice signal are subjected to various processes in the manners described above, the communication image processing routine shown in FIG. 3 is executed in the computing section 51. Specifically, first, a voice signal is loaded from the transmission frame memory 32 (S1), and the level of the voice is computed on the basis of the voice signal (S2). Then, it is determined whether the level is a predetermined value or more (S3). If the level is a predetermined value or more (S3, YES), a voice detection signal is outputted to the image codec section 23, whereby an image codec is set to a low-compression ratio (high-resolution image quality). Accordingly, the data amount of an image signal outputted to the communications network 2 becomes large, but a high-quality motion image of the participant display section 61 of a notable speaking person is displayed in all of the teleconference terminal apparatuses 1 (S4). Then, a resolution flag is set to "1" (S5) to indicate that the quality of the image is high, counting of the time period elapsed since the image quality is changed to high quality is started (S6), and thereafter the routing is ended.

When the level is not the predetermined value or more (S3, NO), it is determined whether the resolution flag indicating the condition of the image quality at the present moment is "1" or not (S7). If the resolution flag is not "1" (S7, NO), it is determined that the image is of low-resolution quality, i.e. the image signal is compressed at a high compression ratio, and the process is executed again starting from S1. On the other hand, when the resolution flag indicating high quality is "1" (S7, YES), it is determined whether a predetermined time period has elapsed since the image quality is changed to high quality (S8). If a predetermined time period has not yet elapsed (S8, NO), the process is executed again starting from S1. Accordingly, even if a speech is interrupted temporarily, the high quality is maintained during the predetermined time period, whereby distortion of the image can be reduced.

When the predetermined time period has elapsed (S8, YES), outputting of the voice detection signal to the image codec section 23 is stopped, whereby the image codec is set to a high compression ratio (low-resolution image quality). Accordingly, the data amount of the image signal outputted to the communications network 2 becomes small and the traffic in the communications network 2 can be reduced (S9). Thereafter, the resolution flag is set to "0" to indicate that the image quality is low (S10), and then the routine is ended.

Summary of the Present Embodiment

As described above, the teleconference terminal apparatus 1 of the present embodiment is for carrying out a teleconference by transmitting/receiving an image signal and voice signal via the communications network 2, and comprises: the image-capturing device (image-capturing device 11 and the like) which generates an image signal by capturing an image; the image output processing section (image processing section 13 and the like) which converts the image signal to a signal mode corresponding to the communications network 2 and outputs the converted signal; the microphone (microphone 14 and the like) which performs detection of a voice along with the image capturing, and thereby generates a voice signal corresponding to the level of the voice; the voice output processing section (voice processing section 16 and the like) which converts the voice signal to a signal mode corresponding to the communications network 2 and outputs the converted signal; and the image output processing control section (computing section 51 and the like) which increases or reduces the amount of data of the image signal outputted from the image output processing section, on the basis of the level of the voice signal.

According to the above configuration, since the amount of data of the image signal transmitted to the communications network 2 can be increased or reduced on the basis of the level of the voice signal, the voice signal can be used as a switch for switching the image quality or screen update interval. For example, an image of particular importance is detected by means of the level of the voice signal in a teleconference, and the amount of data of an image signal of the image is increased so as to set the quality of the image to high quality. Accordingly, compared to the conventional case in which all image signals of the same data amount are transmitted to the communications network 2, contents of particular importance can be checked, through good image quality and the like, while preventing the traffic in the communications network 2 from expanding.

Moreover, the image output processing section of the present embodiment has the image codec section 23 which compresses the image signal, and the image output processing control section is configured so as to increase or reduce the amount of data by changing the compression ratio of the image signal in the image codec section. It should be noted that the present embodiment describes change of compression ratio by using two types of image qualities, i.e. high quality and low quality, but examples are not limited to this embodiment, and thus there may be three or more types of image quality, and the compression ratio may be changed linearly so that high quality is obtained in proportion to the level.

According to the above configuration, when the image is a motion image, the quality of the motion image varies when the motion image is replayed and displayed. However, the movement of the motion image can be made uniform among all of the teleconference terminal apparatuses 1, thus the above configuration can be made excellent in terms of real-time properties.

Furthermore, the teleconference system of the present embodiment comprises a plurality of teleconference terminal apparatuses 1 having the above configuration, and the communications network 2 which connects the teleconference terminal apparatuses 1 so that data can be communicated. According to this configuration, for example, an image of particular importance is detected by means of the level of a voice signal in a teleconference, and the amount of data of the image signal of the image is increased so as to obtain high quality, whereby contents of particular importance can be checked, through good image quality and the like, while preventing the traffic in the communications network 2 from expanding.

Moreover, the teleconference communication method of the present embodiment is a method for carrying out a teleconference by transmitting/receiving an image signal and voice signal via the communications network 2, wherein when an image signal generated by capturing an image is converted to a signal mode corresponding to the communications network 2 and outputted, the amount of data of the image signal is increased or reduced on the basis of the level of a voice which is generated by detecting voice when the image capturing is performed. According to this configuration, since the amount of data of the image signal transmitted to the communications network 2 can be increased or reduced on the basis of the level of the voice signal, the voice signal can be used as a switch for switching the image quality or screen update interval. Therefore, contents of particular importance can be checked, through good image quality and the like, while preventing the traffic in the communications network 2 from expanding.

Modification of the Present Embodiment

In the present embodiment, the compression ratio of the image codec in the image codec section 23 is changed, and thereby the amount of data of the image signal is increased or reduced, but examples are not limited to this example. Specifically, as shown in FIG. 4, a gate 71 (gate) capable of stopping transmission of image signals is provided on a front stage of the encoder section 24, and the computing section 51 (image output processing control section) stops transmission of image signals in the gate 71 at predetermined intervals, whereby the data amount may be increased or reduced. According to this configuration, when the image is a motion image, fluctuation in movement of the motion image occurs among the all teleconference terminal apparatuses 1, but since the image quality of each teleconference terminal apparatus 1 can be made uniform, good visibility can be obtained. It should be noted that the gate 71 may be provided on a front stage of the transmission frame memory 22 or on a front stage of the A/D converter 21. In addition, the teleconference terminal apparatus 1 may change the data amount of the image signal at both compression ratios of the gate 71 and the image codec.

The above has described the embodiment of the present invention, but the above explanation is merely a concrete example and is not to particularly limit the present invention, thus the design of the specific configuration and the like can be changed accordingly. It should be noted that the operations and effects described in the embodiment merely details the most preferred operations and effects produced from the present invention, thus the operations and effects according to the present invention are not limited to the ones described in the embodiment of the present invention.

What is claimed is:

1. A teleconference terminal apparatus for carrying out a teleconference by transmitting and receiving an image signal and voice signal via a communications network, the teleconference terminal apparatus comprising:
an image-capturing device which generates an image signal by capturing an image;
an image output processing unit which converts the image signal to a signal mode corresponding to the communications network and which outputs the converted signal;
a microphone which performs detection of a voice along with the image capturing, and thereby generates a voice signal corresponding to a level of a voice;
a voice output processing unit which converts the voice signal to a signal mode corresponding to the communications network and outputs the converted signal;
an image output processing control unit which increases or reduces an amount of data of the image signal outputted from the image output processing unit, on a basis of the level of the voice signal; and
a display device which receives the image signal increased or reduced by the image output processing control unit and includes a plurality of participant display sections which display participants participating in a teleconference,
wherein the image output processing control unit determines whether the level of the voice of a speaking participant among the participants is a predetermined value or more, and enlarges a participant display section corresponding to the speaking participant among the participant display sections when the level is the predetermined value or more, and
wherein even if the level of the voice becomes less than the predetermined value after enlarging the participant display section, the image output processing control unit determines whether to maintain the enlargement of the participant display section after a predetermined time period has elapsed.

2. The teleconference terminal apparatus according to claim 1, wherein the image output processing unit comprises an image codec unit which compresses the image signal, and the image output processing control unit increases or reduces the data amount by changing the compression ratio of the image signal in the image codec unit.

3. The teleconference terminal apparatus according to claim 2, wherein the image output processing control unit is connected to at least an encoder unit of the image codec unit and a transmission frame memory of the voice output processing unit, which loads a voice signal transmitted from the transmission frame memory, and which transmits, to the encoder unit, a command signal associated with increase or reduction of the data amount of the image signal, on a basis of level information of the loaded voice signal.

4. The teleconference terminal apparatus according to claim 3, wherein the image output processing control unit determines whether the level information of the loaded voice signal, which is inputted, is a predetermined value or more, and wherein the command signal is transmitted to the encoder unit such that, if the level information is at least the predetermined value as a result of the determination, the image signal is obtained as low-compression ratio data, and, if the level information is less than the predetermined value as a result of the determination, the image signal is obtained as high-compression ratio data.

5. The teleconference terminal apparatus according to claim 4, wherein, in a case in which the level information is less than the predetermined value as a result of the determination, when a current image is set so that the low-compression ratio data are obtained, the determination is repeated until a predetermined time period elapses, and as a result the command signal is transmitted to the encoder unit so that the image signal is obtained as high-compression ratio data, on the condition that it is still determined that the level information is less than the predetermined value.

6. The teleconference terminal apparatus according to claim 1, wherein the image output processing unit comprises a gate which stops transmission of image signals, and the image output processing control unit increases or reduces the data amount by stopping transmission of image signals in the gate at fixed intervals.

7. A teleconference system comprising:
   a plurality of the teleconference terminal apparatuses according to claim 1; and
   a communications network which connects the teleconference terminal apparatuses to communicate data.

8. The teleconference terminal apparatus according to claim 1, wherein the display device further includes a resource display section which displays resources used in the teleconference.

9. A teleconference terminal apparatus for carrying out a teleconference by transmitting and receiving an image signal and voice signal via a communications network, the teleconference terminal apparatus comprising:
   an image-capturing device which generates an image signal by capturing an image;
   an image output processing unit which converts the image signal to a signal mode corresponding to the communications network and which outputs the converted signal;
   a microphone which performs detection of a voice along with the image capturing, and thereby generates a voice signal corresponding to a level of a voice;
   a voice output processing unit which converts the voice signal to a signal mode corresponding to the communications network and outputs the converted signal;
   an image output processing control unit which increases or reduces an amount of data of the image signal outputted from the image output processing unit, on a basis of the level of the voice signal; and
   a display device which receives the image signal increased or reduced by the image output processing control unit and includes a plurality of participant display sections which display participants participating in a teleconference,
   wherein the image output processing control unit determines whether the level of the voice of a speaking participant among the participants is a predetermined value or more, and changes a display position of a participant display section corresponding to the speaking participant among the participant display sections when the level is the predetermined value or more, and
   wherein even if the level of the voice becomes less than the predetermined value after changing the display position, the image output processing control unit determines whether to maintain the change of the display position after a predetermined time period has elapsed.

10. The teleconference terminal apparatus according to claim 9, wherein the display device further includes a resource display section which displays resources used in the teleconference.

11. A teleconference terminal apparatus for carrying out a teleconference by transmitting and receiving an image signal and voice signal via a communications network, the teleconference terminal apparatus comprising:
   an image-capturing device which generates an image signal by capturing an image;
   an image output processing unit which converts the image signal to a signal mode corresponding to the communications network and which outputs the converted signal;
   a microphone which performs detection of a voice along with the image capturing, and thereby generates a voice signal corresponding to a level of a voice;
   a voice output processing unit which converts the voice signal to a signal mode corresponding to the communications network and outputs the converted signal;
   an image output processing control unit which increases or reduces an amount of data of the image signal outputted from the image output processing unit, on a basis of the level of the voice signal; and
   a display device which receives the image signal increased or reduced by the image output processing control unit and includes a plurality of participant display sections which display participants participating in a teleconference and a resource display section which displays resources used in the teleconference,
   wherein even if the level of the voice signal becomes less than a predetermined value after increasing the amount of data, the image output processing control unit determines whether to maintain the increase of the amount of data after a predetermined time period has elapsed.

12. A method of controlling a teleconference which is carried out by transmitting or receiving an image signal and a voice signal via a communications network, the method comprising:
   detecting a specific image based on the level of the voice signal;
   displaying the specific image on a display device for a teleconference by enlarging the specific image; and
   after a predetermined time period has elapsed after the specific image is enlarged, detecting the specific image based on the level of the voice signal again.

13. The method according to claim 12, further comprising transmitting or receiving the image signal and the voice signal of a participant participating in the teleconference,
   wherein the specific image is an image of the participant.

14. The method according to claim 12, further comprising displaying the specific image on the display device as a high quality image by increasing an amount of data of the image signal.

15. The method according to claim 12, further comprising changing a display position of the specific image on the display device.

* * * * *